Sept. 15, 1925.  W. S. GAUNTT  1,553,438
RESILIENT COMPOSITION
Filed Jan. 24, 1921

Witness:
Fred C. Fischer

Inventor:
Warren S. Gauntt
By F. G. Fischer
Attorney

Patented Sept. 15, 1925.

1,553,438

UNITED STATES PATENT OFFICE.

WARREN S. GAUNTT, OF KANSAS CITY, MISSOURI.

RESILIENT COMPOSITION.

Application filed January 24, 1921. Serial No. 439,344.

*To all whom it may concern:*

Be it known that I, WARREN S. GAUNTT, a citizen of the United States, residing at Kansas City, in the county of Jackson and State of Missouri, have invented certain new and useful Improvements in Resilient Compositions, of which the following is a specification.

My invention relates to improvements in resilient compositions in which rubber, vulcanizable gums and other similar substances form a basis, having combined therewith fine metallic, elongated fibers.

One object of the invention is to provide a composition of matter which will have the characteristics of rubber in elasticity and pliability, with the added features of greater resistance to wear, resistance to slipping upon wet surfaces, and non-puncturability from the sharp points of various substances.

A further object is to produce a composition of matter containing and embracing the foregoing characteristics and which at the same time may be molded into various forms and articles which shall possess these characteristics and possess strength, durability and nonskid qualities to a marked degree.

With these ends in view, my invention consists in certain materials and compositions of materials in about the proportions hereinafter specified, described, and set forth in the claims, reference being made to the accompanying drawing, in which:

Figure 1:
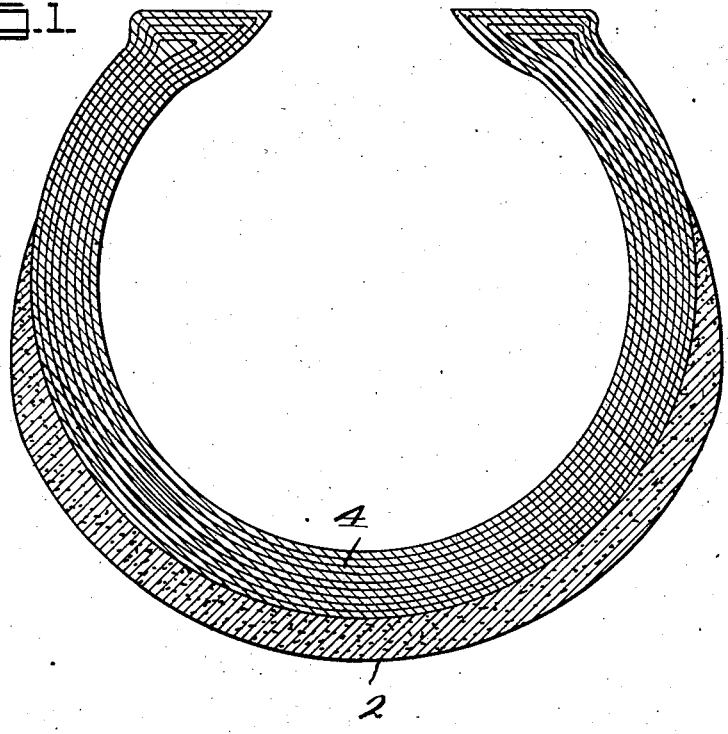
Fig. 1 is a cross section of a tire embodying the invention.
Figure 2:
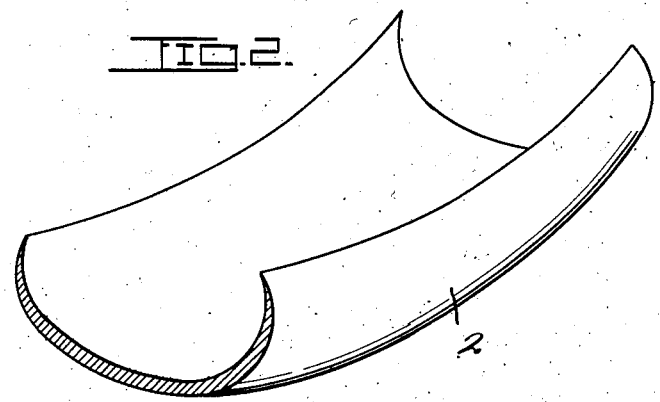
Fig. 2 is a fragmentary detail of a tire tread embodying the invention.

In the construction of tires, I form a tread strip 2 of any desired length, width and thickness, consisting of a mixture of two kinds of gum, sulphur, oxide of zinc and a metallic wool, preferably, steel wool. One of the gums is, preferably, rubber or any of its equivalents, as ballata, guttapercha, etc. The other gum is sap from the zapote tree which I find in practice is more durable and retains its elasticity longer than the sap of the rubber tree. The zapote sap or gum also retains its elasticity under greater variations in temperature than rubber gum. The zapote gum is, preferably, derived from the chico zapote tree which is plentiful in Mexico and South America and produces the chicle for commercial gum.

The two gums are first dissolved after which the sulphur and oxide of zinc in powdered form are added, the sulphur acting as a vulcanizing agent and the oxide of zinc as a filler and toughening agent. The metallic wool is then added and the resultant material is formed into strips of desired length, width and thickness for use as treads on tires of different sizes.

The above ingredients may be used in different proportions to suit requirements, viz:

|  | Per cent. |
|---|---|
| Rubber gum | 60 to 80 |
| Zapote gum | 1 to 2 |
| Sulphur | 1 to 2 |
| Oxide of zinc | 2 to 4 |
| Metallic wool | 20 to 30 |

The carcasses of the tires are formed from any desired number of layers of fabric strips of suitable length, width and thickness and treated with the following composition, the ingredients of which may be used in different proportions to suit requirements, viz:

|  | Per cent. |
|---|---|
| Rubber gum | 90 to 100 |
| Oxide of zinc | ½ to 2 |
| Sulphur | ½ to 2 |
| Zapote gum | 1 to 3 |

When the material is to be incorporated into a tire, the usual forms are employed, over which the carcass 4 is built. The strip of material 2 for the tread is then placed around the carcass after which the whole is subjected to the vulcanizing process.

A tire thus produced will have the elasticity and pliability of rubber, with the added feature of longevity imparted by the presence of the zapote gum which does not rot so quickly as rubber when subjected to moisture, variations in temperature, etc. The presence of the metallic wool in the tread increases the wearing qualities of the latter, prevents it from skidding and protects it to a marked degree from being punctured.

Having thus described my invention, what I claim and desire to secure by Letters Patent, is:

A resilient composition comprising rubber gum, zapote gum, oxide of zinc, metallic wool and sulphur.

In testimony whereof I affix my signature.

WARREN S. GAUNTT.